Jan. 9, 1968   A. A. BAILEY   3,362,076
DIFFERENTIAL AIR GAUGE
Filed March 14, 1966   3 Sheets-Sheet 1
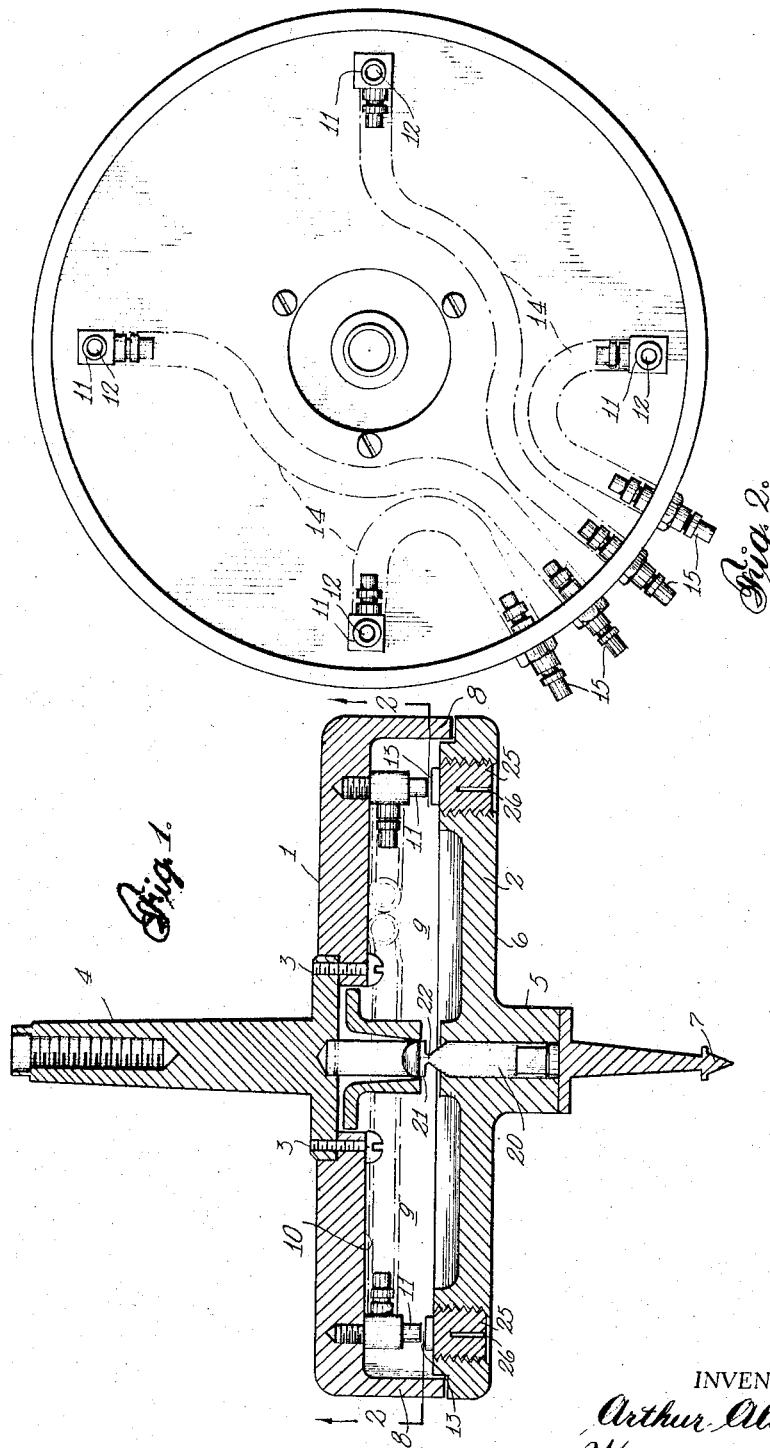
INVENTOR
Arthur Albert Bailey
BY Weir, Marshall,
MacRae & Lamb
PATENT AGENT

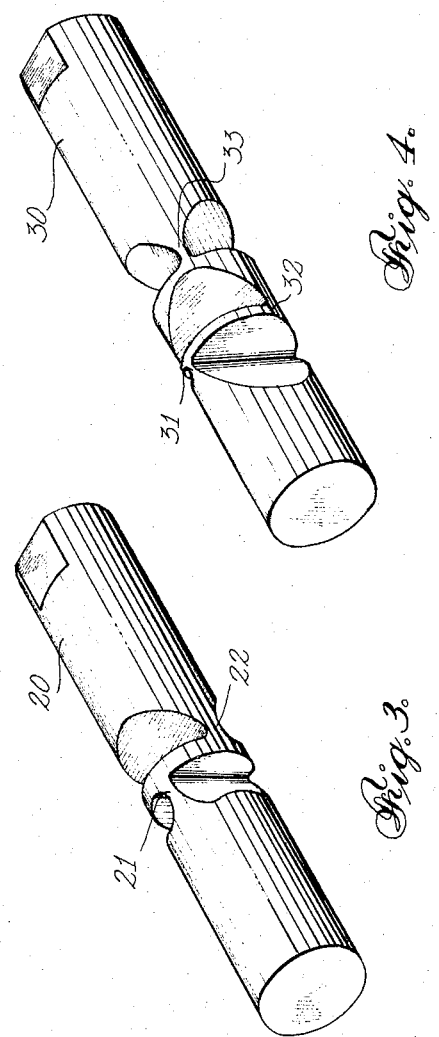

Jan. 9, 1968  A. A. BAILEY  3,362,076
DIFFERENTIAL AIR GAUGE
Filed March 14, 1966  3 Sheets-Sheet 3
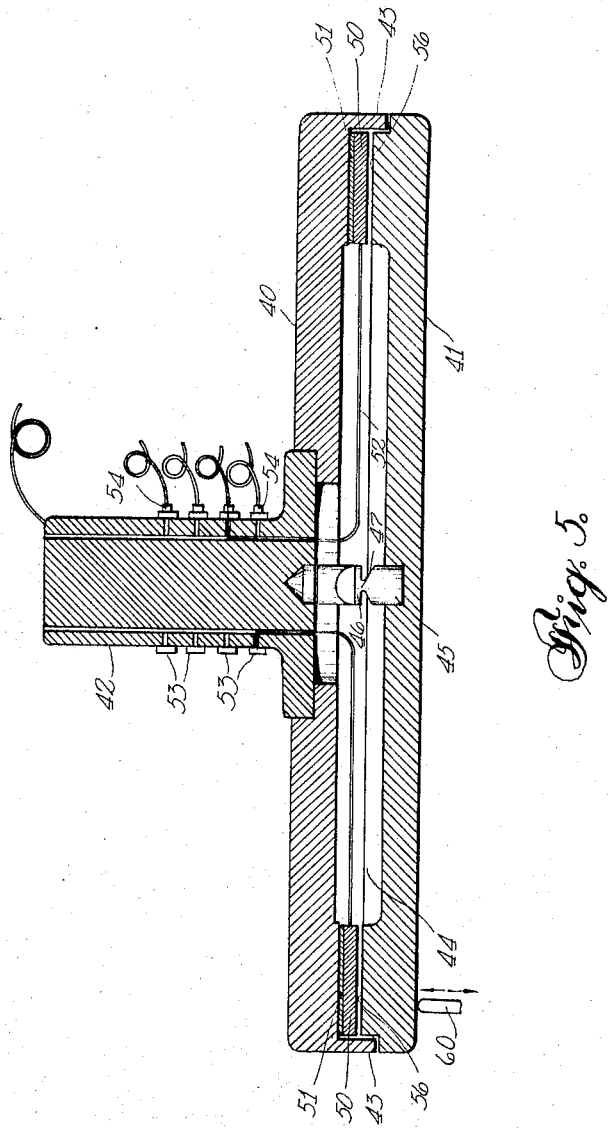
INVENTOR
Arthur Albert Bailey
BY Weir, Marshall,
MacRae & Lamb
PATENT AGENT

United States Patent Office 3,362,076
Patented Jan. 9, 1968

3,362,076
DIFFERENTIAL AIR GAUGE
Arthur Albert Bailey, Ottawa, Ontario, Canada, assignor to Computing Devices of Canada Limited, Ottawa, Ontario, Canada
Filed Mar. 14, 1966, Ser. No. 534,139
20 Claims. (Cl. 33—169)

ABSTRACT OF THE DISCLOSURE

Apparatus for detecting, and indicating, displacement from a datum position, the apparatus resolving the displacement along at least two axes. Two members or housings, in opposed relationship, are connected by a member having thin flexible sections, a section extending on each of the axes. Any displacement of one member or housing relative to the other can only occur by flexing of the thin sections. The movement of the member is resolved into movements along the axes and can be used to provide indication of the displacement along the axes. Conveniently, the movement of the member actuates detecting means situated on each of the axes.

---

This invention relates to the detection of displacement from a datum relative to predetermined axes. It also relates to the indication and measurement of the displacement.

A particular application of the invention is to the detection of the displacement of the centre of a hole from a desired position or datum, the displacement being detected, and indicated, along axes, generally two axes, whereby a correction can be applied.

To appreciate a displacement it is desirable to be able to detect such displacement along at least two complementary axes. For example, if two holes are desired to be at predetermined relative positions, then, for convenience in machining or otherwise forming the holes, the relative positions are usually defined on two axes, generally referred to as the X and Y axes. Therefore, it is desirable that any displacement from the desired position of one hole relative to another be detected so that an indication of the displacement can be obtained along the X and Y axes.

In one method of detecting errors in centre to centre distances of holes, a very accurate clock gage is attached to the spindle of a suitable machine, for example, a jig boring machine, and having positioned a first hole in a workpiece accurately relative to the spindle and gage, the workpiece is traversed by moving the machine table using the normal feed screws and associated indicator mechanism to bring a second hole to the same position. The probe of the gage is then lowered into the hole. By rotating the spindle of the machine, together with the gage, any displacement of the second hole from the desired position can be detected, and measured. By taking readings on the gage at particular rotative positions, the displacement can be measured along the X and Y axes.

Another method is to set up the workpiece vertically with the holes horizontally, measuring the distance between axes of the holes first in one direction and then turning the workpiece through 90° in the vertical plane and measuring the distances between axes in the new direction. This method is commonly termed "open face inspection." Both the above methods are less accurate than that provided by the present invention, and are very time consuming.

To obtain the necessary accuracy it is essential that the movement of the machine table, and the rotation of the spindle, be accurate and also that the table be capable of accurate positioning. High standards of accuracy for the movement and positioning of the machine table are readily obtainable with present day machines, but considerable inaccuracies are introduced by rotation of the spindle and by positioning the spindle at different heights. Some clearance is necessary in the spindle bearings for the spindle to move and the spindle takes up different positions each time it is rotated. Also it is very difficult to ensure that the vertical axis of the spindle is exactly perpendicular to the plane of the machine table. Thus one source of errors is the rotation of the spindle and another source is the vertical movement of the spindle to take readings at different heights.

Normally, to reduce the effect of the errors arising from rotation of the spindle, several series of readings are taken and the mean of these accepted as the actual measurement. Such a method is very time consuming and is still not completely accurate. To check a single workpiece with many centre to centre distances, considerable time is necessary.

Similar difficulties arise in detecting, and measuring, other displacements from a datum, for example when checking gears. This has given rise to much research into alternative methods for detecting and measuring displacements which methods would be quicker and easier and more accurate.

It is an object of the present invention to provide an apparatus for detecting a displacement and to resolve the displacement along at least two complementary axes.

It is a further object to provide an apparatus which will detect displacement of a locus from a desired position, resolving the displacement along at least two complementary axes.

In particular it is an object of the present invention to detect inacuracies in the centre to centre distances of holes and other similar distances produced by machining, resolving such inaccuracies along two axes at right angles to very high degrees of accuracy.

Whilst generally the apparatus of the present invention resolves linear displacements along two axes which are stationary relative to the displacement, it is also possible to provide apparatus in which the axes rotate, in a plane containing the axes, relative to the linear displacement, and it is another object of the present invention to provide an apparatus for the detection of linear displacement and to resolve the displacement along at least two axes, which axes are also rotatable, in a plane containing both axes, relative to the linear displacement.

The present invention provides a means for accurately and quickly detecting displacements from a datum, is easy to use and is of simple form. Furthermore it detects displacements along predetermined axes and can be used in conjunction with normal air or other gauges to give indications on these axes which can be applied as a correction. Thus, for example, in a tape controlled machine, the indications can be fed into the controller as corrections along the axes on which the machine is controlled, and moved.

In accordance with the present invention there is provided apparatus for detecting a displacement from a datum relative to predetermined axes, comprising two opposed housings each extending in substantially horizontal planes, one of the housings movable as a result of the displacement to be detected, and a read connecting the two housings substantially on the vertical axis passing through the centre of gravity of the movable housing, the reed having a plurality of sections of thin cross-section when viewed in a horizontal plane, the sections extending horizontally along axes at an angle to each other, the axes containing the vertical axis through the centre of gravity of the movable housing. The two housings have a plurality of opposed complementary surfaces, at least one pair of opposed surfaces for each of said axes and positioned on an axis normal thereto, the opposed surfaces being at a predetermined clearance. The movable housing is tilted by the displacement, the tilting varying the clearance between at least one pair of surfaces, means being provided for detecting such variation in clearance.

The thin sections of the reed act to determine the axes about which the moving housing tilts. If the sections are at right angles, any displacement acting on the movable housing is resolved into a tilting about either one or the other of the horizontal axes along which the thin sections extend, or about both axes. The clearance between a pair of surfaces positioned an axis normal to the axis about which the movable housing tilts will be varied and the variation of their clearance can be detected and measured.

One way of obtaining an indication of the tilt is to use air gages. A gas jet orifice is formed in one surface of each of the pairs of surfaces, preferably in those surfaces of the housing not moved by the displacement. Variation of the clearance will then modify the air flow through the orifice and this can be indicated on an air gage in the normal manner. At least one jet orifice and complementary surface is required for each section, spaced a distance from the vertical axis through the centre of gravity of the movable housing and generally an orifice and complementary surface is positioned on each side of the vertical axis to give differential indication.

An alternative way of obtaining an indication of the tilt is to use electrical gaging means which detect, and measure, variations in air gaps between two conducting surfaces.

In detecting the displacement of centres of holes, and like displacements, the movable member is tilted by a probe which extends vertically from the movable member, on the vertical axis through the centre of gravity of the member, the probe entering the holes, the centres of which are to be checked. It may also be desirable to detect a displacement relative to predetermined axes, which axes are themselves movable. For example, the movable member can be moved by a probe or similar member in contact with the movable housing at a position spaced from the vertical axis through the centre of gravity of the movable member. The probe can move linearly along an axis parallel to the vertical axis referred to. At the same time the angular relationship of the predetermined axes relative to the contact position of the probe can be varied, either by rotating the members about the vertical axis or by moving the probe around the vertical axis.

The invention will be readily understood by the following description of certain embodiments, in conjunction with the accompanying drawings, in which:

FIGURE 1 is a vertical cross-section through the axis of one embodiment,

FIGURE 2 is an inverted plan view on the line 2—2 of FIGURE 1,

FIGURE 3 is a perspective view of one form of reed,

FIGURE 4 is a perspective view of an alternative form of reed, and

FIGURE 5 is a view similar to that of FIGURE 1, illustrating a further embodiment.

The embodiment illustrated in FIGURES 1 and 2 includes a reed of the form illustrated in FIGURE 3, and, as an example of the application of the present invention, is arranged as an apparatus for the detection, and indication, of the displacement of a centre, such as a hole centre, from a predetermined position along two axes at right angles. The apparatus comprises two horizontally opposed housings 1 and 2, one housing having attached thereto by screws 3, a spindle or mandrel 4 by which the apparatus can be attached to a machine. In the present example, the mandrel 4 is tapered to fit into the tapered socket of a machine spindle. The other housing has a spigot 5 on its lower surface 6 and a probe 7 is attached to the spigot.

The housing 1 has an annular rim 8 extending downwardly toward housing 2, the rim defining the periphery of a chamber 9 between the two housings. Positioned adjacent the rim 8, and attached to the inner surface 10 of housing 1 are four air jet nozzles 11 having small orifices 12. Four complementary surfaces 13 are provided on the inner surface of housing 2, a complementary surface being positioned opposite each nozzle 11. Tubes 14 connect the nozzles 11 to connectors 15 on the housing 1. Connections can be made from the connectors 15 to suitable air gages (not shown).

The two housings 1 and 2 are connected by a reed 20. In the present example, the reed 20 has two thin sections 21 and 22 respectively, the thin sections extending across the reed normal to the longitudinal axis through the reed. The two sections 21 and 22 are at right angles to each other, and the arrangement of form of the thin sections can best be seen in FIGURE 3. Each section will permit flexing of the reed in one direction but is very stiff in a direction at right angles thereto.

The reed 20 is rigidly supported at each end in the housings 1 and 2 and it will be seen that any attempt to displace housing 2 relative to housing 1 will result in tilting of housing 2, relative to housing 1, about an axis in the plane through one thin section or the other thin section or in a combined tilting about both these axes. The nozzles 11, and complementary surfaces 13, are positioned on the axes about which the housing tilts. Tilting of the housing will vary the clearances between nozzles 11 and surfaces 13 on one axis, or the other axis, or on both axes, depending on the particular form of tilting.

The operation of the apparatus illustrated in FIGURES 1 and 2 is as follows. As stated above, the apparatus is as used for the detection of displacement of a centre, such as a hole centre. The apparatus is used in conjunction with a suitable machine, for example a jig boring machine. The tapered mandrel 4 is inserted into the correspondingly tapered boring spindle of the machine, the probe 7 depending vertically downward. A workpiece to be checked is placed on the machine table and a first hole lined up with the probe. The probe 7 is lowered into the hole and the table adjusted by the feed screws until the gauges attached to the connectors 15 indicate that the no tilting of the housing 2 is present. The probe is then raised out of the hole and the machine table and workpiece traversed using as coordinates the dimensions given on the machining drawing to locate a further hole beneath the probe. If the machining is accurate, then when the probe is lowered into the second hole no sideways movement or displacement of the probe occurs and thus no tilting of the housing 2. If the hole is displaced from its correct position however, the probe is displaced sideways in the direction of the displacement of the hole. The displacement of the probe tilts the housing 1, the tilt being resolved into rotation about one or the other or both of the above described axes. The tilting, or rotation, of the housing varies the clearances between respective nozzles 11 and surfaces 13, these variations being indicated on the air gages.

By arranging the axes about which the housing 1 tilts or rotates to be coincident with the coordinate axes of the workpiece, the displacement of the hole will be indicated along those coordinate axes. By suitably calibrating the air gages, the measurement of centre displacement can be read off directly in desired increments. Such a facility is extremely useful when the workpiece is being produced on a machine which is tape controlled. Any corrections can be fed into the machine, or made as a correction on the tape so that following workpieces are produced correctly.

The apparatus in FIGURES 1 and 2 is used with housing 1 on top and housing 2 underneath, housing 2 being the movable one. To avoid the effect of gravity it is preferable that the thin sections are symmetrical about the vertical axis through the centre of gravity of the housing 2. In the example illustrated, this vertical axis passes through the position where the planes of the two thin sections intercept each other. Slight displacement of the vertical axis through the centre of gravity of the movable housing is not critical as the effect can readily be offset on the gages.

To provide initial setting of the clearances between nozzles 11 and surfaces 13, the latter can be formed on the ends of threaded plugs 25 in threaded holes in the housing 2. The vertical position of the plugs in the housing, and thus the clearance between the related nozzle and surface, can be varied by rotating the plug, as by a screwdriver in slots 26. The slots 26 can also be used to provide a resilience between the two halves of the plugs to give a locking action.

The apparatus described so far is suitable for detecting displacements along axes at right angles. If displacements along axes at other angles are required then the thin sections 21 and 22 are arranged at the particular angle required. Also displacements along more than two axes may be required. FIGURE 4 illustrates a reed 30 having three thin sections 31, 32, 33, arranged at 120° to each other. A complementary arrangement of nozzles and surfaces will also be provided.

The probe 7 can be machined to be the exact size of the holes to be checked. Alternatively the probe can be smaller than the holes to be checked and readings taken at four points on the circumference of each hole. The resultant readings can be used to indicate any displacement of the hole centre, and also any variation in size from that intended.

The apparatus can also be used with the probe extending vertically upward, that is with the fixed housing 1 as the bottom housing and the movable housing 2 as the top housing. No alterations to the main part of the apparatus are necessary; it may only be necessary to provide a different form of mounting other than the tapered mandrel 4.

The size and shaping of the effective part of the probe can vary. As described above, the probe can be made to exactly fit the size of hole being checked, or can be smaller. A further alternative, useful when only centre to centre distances are being checked and no checking of hole size is required, is a tapered probe. Probes need not be of circular cross-section, and when displacements other than hole centres are being checked, various forms of probes can be used.

The invention has so far been described in relation to the detection, and measurement, of displacement as applied to checking workpieces and the like, to check, and indicate inaccuracies. The present invention, however, is capable of much wider application and FIGURE 5 illustrates an embodiment which can be used to detect, and indicate the position and amount of a linear movement or displacement relative to a rotative movement or vice versa, the linear movement being parallel, or at least having a component of direction parallel, to the axis of the rotative movement.

In this embodiment, the apparatus has two opposed horizontally extending housings 40 and 41. Housing 40 has a mandrel 42 attached thereto, and also a downwardly extending rim 43. The housings 40 and 41 together with rim 43 define a chamber 44. The two housings are connected on their central axes by a reed 45. The reed 45 has two thin sections 46, 47 extending at right angles to each other, being of the same form as illustrated in FIGURE 3.

The embodiment of FIGURE 5 also illustrates an alternative form of sensing or detecting tilting of one housing relative to the other. Instead of air nozzles and complementary surfaces as in FIGURES 1 and 2, an electrical system is used. Attached to the housing 40 are four electrically conducting pads 50. The pads 50 are positioned on axes at right angles to each other, the axes coinciding with the axes through the sections 46 and 47. The pads 50 are insulated from the housing 40 by insulating gaskets 51. Alternatively the housing 40 can be of insulating material.

The pads 50 are connected by leads 52 to commutator rings 53 attached to the mandrel 42. The rings 53 are insulated from the mandrel. Brushes, indicated diagrammatically at 54, transfer electrical signals from the rings 53 to indicating means, (not shown).

Formed on the inner surface of the housing 41 are complementary surfaces 56 spaced a short distance from the pads 50. The complementary surfaces 56, pads 50 and the intervening clearances act as capacitors, the capacitance value of which is varied by variation of the clearance between pads and surfaces. Thus tilting of housing 41 will vary at least one pair of clearances and produce a variation in the signal output. These signal variations can be used to indicate a displacement which tilts one housing relative to the other and to resolve the displacement along two axes, in a similar manner as the variation of the clearances in the arrangement illustrated in FIGURES 1 and 2 can be used.

Returning to the use of the embodiment illustrated in FIGURE 5, the mandrel 42 is supported in a member, (not shown) which is rotated in accordance with a particular rotational input. A movable probe, indicated diagrammatically at 60, is moved linearly, as indicated by the arrows, in accordance with another input. An example of an application of this arrangement is for a navigational instrument in which a heading provides the rotative movement and speed the linear movement. If the craft is moving with the correct heading, the relative positions of the housings 40, 41 to the probe 60 is that which positions one of the axes through the sections 46, 47, to pass through the point of contact of the probe. The other axis will be at right angles thereto.

Movement of the probe will then tilt the housing 41 about one axis and the indicator means receiving the output will merely indicate that the craft has the desired heading. If the heading varies from the desired one, the housings 40, 41 will rotate in accordance with such deviation. The point of contact of the probe 60 will now not be on one of the axes through the sections 46, 47. Tilting of the housing 41 will then be about both axes and the indicator means will indicate that the craft has an incorrect heading and can be calibrated to give the error, and/or the necessary correction. As the probe 60 is speed actuated, the indication of correction will be related to speed.

In the alternative arrangement to give the same result, the housings 40, 41 remain static and the probe 60, in addition to moving linearly can also move in a circular orbit concentrically about the vertical axis of the reed 45.

It will be appreciated that the electrical sensing system of FIGURE 5 can be used in the embodiment of FIGURES 1 and 2 and similarly, the gas jet system of FIGURES 1 and 2 can be used in the embodiment of FIGURE 5. Other sensing systems can also be used.

Apparatus in accordance with the invention can be used also to check position of edges or surfaces from a datum, and indicate such variations. By positioning the side of the probe against a surface of a workpiece, and moving the workpiece or the apparatus, an indication of the variation in level of the surface can be obtained, and it is also possible to use the apparatus to check the profile of a surface by detecting and indicating variations in the surface from a series of co-ordinates which define the desired profile. In gear checking it is possible to check gear centres and also the various other dimensions of a gear. It is also possible to check the profile of gear teeth by checking for variations from datum coordinates.

I claim:

1. Apparatus for detecting a displacement from a datum relative to predetermined axes comprising, two horizontally opposed members, one of said members movable in accordance with said displacement; means connecting said members, said means comprising at least one connecting member extending between the horizontal members and including a plurality of sections of reduced thickness in a horizontal plane, the sections extending along said predetermined axes and positioned symmetrically about a vertical axis through the centre of gravity of the movable member; means for moving the movable member in accordance with said displacement, the movable member constrained by said sections to move by tilting only about said axes; and means actuated by the movement of the movable member.

2. Apparatus as claimed in claim 1 wherein said means connecting the two members comprises a reed member having said plurality of sections formed therein.

3. Apparatus as claimed in claim 2 wherein the reed member has one section for each axis.

4. Apparatus as claimed in claim 1 wherein said axes are at right angles to each other.

5. Apparatus as claimed in claim 1 including a probe attached to said movable member, said probe moved laterally by said displacement.

6. Apparatus as claimed in claim 1 wherein said means connecting the two members comprises a reed member comprising a plurality of said sections, one section for each axis, said axes being at right angles to each other.

7. Apparatus as claimed in claim 1 including a probe in contact with said movable member at a position spaced from the vertical axis through the centre of gravity of said movable member, said probe movable relative to said members, about said vertical axis.

8. Apparatus as claimed in claim 1 wherein the means actuated by the movement of the movable member comprises a plurality of gas orifices in one member, at least one on each of said axes and spaced from the said vertical axis, and a plurality of complementary surfaces on said other member, opposed to said orifices, said orifices and said surfaces being at predetermined clearances, and means for supplying a pressurized gas to said orifices.

9. Apparatus as claimed in claim 8 wherein two orifices are positioned on each axis, on each side of said vertical axes.

10. Apparatus as claimed in claim 8 wherein said surfaces are movable to adjust said clearances.

11. Apparatus as claimed in claim 1 wherein the means actuated by the movement of the movable member comprises pairs of electrical elements, at least one pair on each of said axes and spaced from said vertical axis, one element of each pair attached to one member and the other element attached to the other member, and having a predetermined clearance between each element of a pair, variation in said clearance varying an electrical value of a pair.

12. Apparatus as claimed in claim 11 wherein at least one of each pair of elements is movable to adjust said predetermined clearance.

13. Apparatus as claimed in claim 1 wherein the movable member is positioned below the other member.

14. Apparatus as claimed in claim 1 wherein the movable member is positioned above the other member.

15. Apparatus as claimed in claim 1 wherein one member is also rotatable relative to the other member.

16. Apparatus for detecting a centre to centre displacement from a datum relative to predetermined axes comprising; two opposed housings extending substantially horizontally one beneath the other, one of said housings being movable in accordance with said displacement; a reed connecting the two housings substantially on the vertical axis through the centre of gravity of the movable housing, said reed having a plurality of sections of reduced thickness in a horizontal plane, said sections positioned one above the other and extending horizontally along said axes and symmetrical about said vertical axis; a probe attached to and extending vertically from the movable housing substantially coaxial with said vertical axis, said probe adapted to be positioned at each of said centres and moved by displacement of a centre from a desired position to move said movable member, the movable member constrained by said sections to move by tilting only about said axes; a plurality of gas jet nozzles attached to one of said housings, each nozzle having an orifice and positioned on one of said axes, two nozzles on each axis either side of said vertical axis; a plurality of complementary surfaces on the other of said housings, a surface opposite each orifice, said surfaces being at predetermined clearances from said orifices; and means connecting a pressure gas supply to each of said nozzles, tilting of the movable member varying at least some of said clearances and modifying the gas flow through said orifices.

17. Apparatus as claimed in claim 16 wherein said movable housing is the lower housing, said probe attached to and depending from the lower surface of the movable housing.

18. Apparatus as claimed in claim 16, for checking centre-to-centre distances of holes along two axes at right angles, wherein said reed has two sections of reduced thickness at right angles to each other.

19. Apparatus as claimed in claim 16 for checking centre-to-centre distances of holes wherein said probe includes an end portion for insertion in said holes.

20. Apparatus as claimed in claim 1, wherein the means for moving the movable member includes a probe in contact with the movable member at a position spaced laterally from the said vertical axis, said probe movable linearly along an axis parallel to said vertical axis; the said axes being movable in a plane containing said axes to vary the angular relationship between said probe and said axes.

References Cited

UNITED STATES PATENTS 2,831,263 4/1958 Mahlmeister.
3,028,675 4/1962 Mahlmeister et al.

FOREIGN PATENTS 777,082 6/1957 Great Britain.

HARRY N. HAROIAN, *Primary Examiner.*